United States Patent [19]
Dolan et al.

[11] Patent Number: 5,723,825
[45] Date of Patent: Mar. 3, 1998

[54] TRANSPORT APPARATUS FOR A WEIGHING MODULE

[75] Inventors: Donald T. Dolan, Ridgefield; Gerald C. Freeman, Norwalk; Flavio M. Manduley, Woodbury; Pushpavadan S. Nagarsheth, Danbury; Edilberto I. Salazar, Brookfield, all of Conn.

[73] Assignee: Pitney Bowes Inc., Stamford, Conn.

[21] Appl. No.: 625,375

[22] Filed: Apr. 1, 1996

[51] Int. Cl.[6] .................. G01G 19/02; B65H 5/00
[52] U.S. Cl. .................. 177/145; 271/2; 271/902; 177/161
[58] Field of Search .................. 177/145, 161, 177/253, 262, 116, 119, 120; 271/4.1, 10.11, 902, 2

[56] References Cited

U.S. PATENT DOCUMENTS

| | | | |
|---|---|---|---|
| 3,960,227 | 6/1976 | Zucker et al. | 177/262 |
| 4,500,086 | 2/1985 | Garavuso | 271/902 |
| 4,534,551 | 8/1985 | Jones | 271/902 |
| 4,742,878 | 5/1988 | Freeman et al. | 177/145 |
| 4,836,311 | 6/1989 | Hubbard | 177/145 |
| 4,848,492 | 7/1989 | Hubbard et al. | 177/145 |
| 4,892,162 | 1/1990 | Dolan | 177/25.15 |
| 4,893,249 | 1/1990 | Silverberg | 364/464.03 |
| 4,956,782 | 9/1990 | Freeman et al. | 364/464.03 |
| 5,029,837 | 7/1991 | Uchiyama | 271/902 |
| 5,109,937 | 5/1992 | Kipp | 177/145 |
| 5,190,115 | 3/1993 | Dolan et al. | 177/25.15 |
| 5,220,969 | 6/1993 | DeBarber et al. | 177/145 |
| 5,256,835 | 10/1993 | Rydzak | 177/145 |
| 5,270,563 | 12/1993 | Mahoney | 177/145 |
| 5,326,093 | 7/1994 | Sollitt | 271/902 |
| 5,449,160 | 9/1995 | Hou et al. | 271/902 |
| 5,449,166 | 9/1995 | Lohmann et al. | 271/902 |
| 5,498,114 | 3/1996 | Gregoire et al. | 177/120 |

*Primary Examiner*—Michael L. Gellner
*Assistant Examiner*—Randy W. Gibson
*Attorney, Agent, or Firm*—Angelo N. Chaclas; Melvin J. Scolnick

[57] ABSTRACT

An apparatus and method for feeding a mailpiece into and out of a weighing module. The apparatus comprises a device for feeding the mailpiece; and a device for positioning the feeding device in a first position for receiving the mailpiece from a first direction and feeding the mailpiece into the weighing module. Additionally, the positioning device moves the feeding device into a second position for feeding the mailpiece in a second direction out of the weighing module. The feed device includes a drive roller and an idler roller for keeping the mailpiece in operative engagement with the drive roller. The method comprises the steps of: (a) positioning a feeding device in a first position for receiving the mailpiece from a first direction; (b) feeding the mailpiece in the first direction into the weighing module; and (c) positioning the feeding device in a second position for feeding the mailpiece in a second direction out of the weighing module.

20 Claims, 9 Drawing Sheets

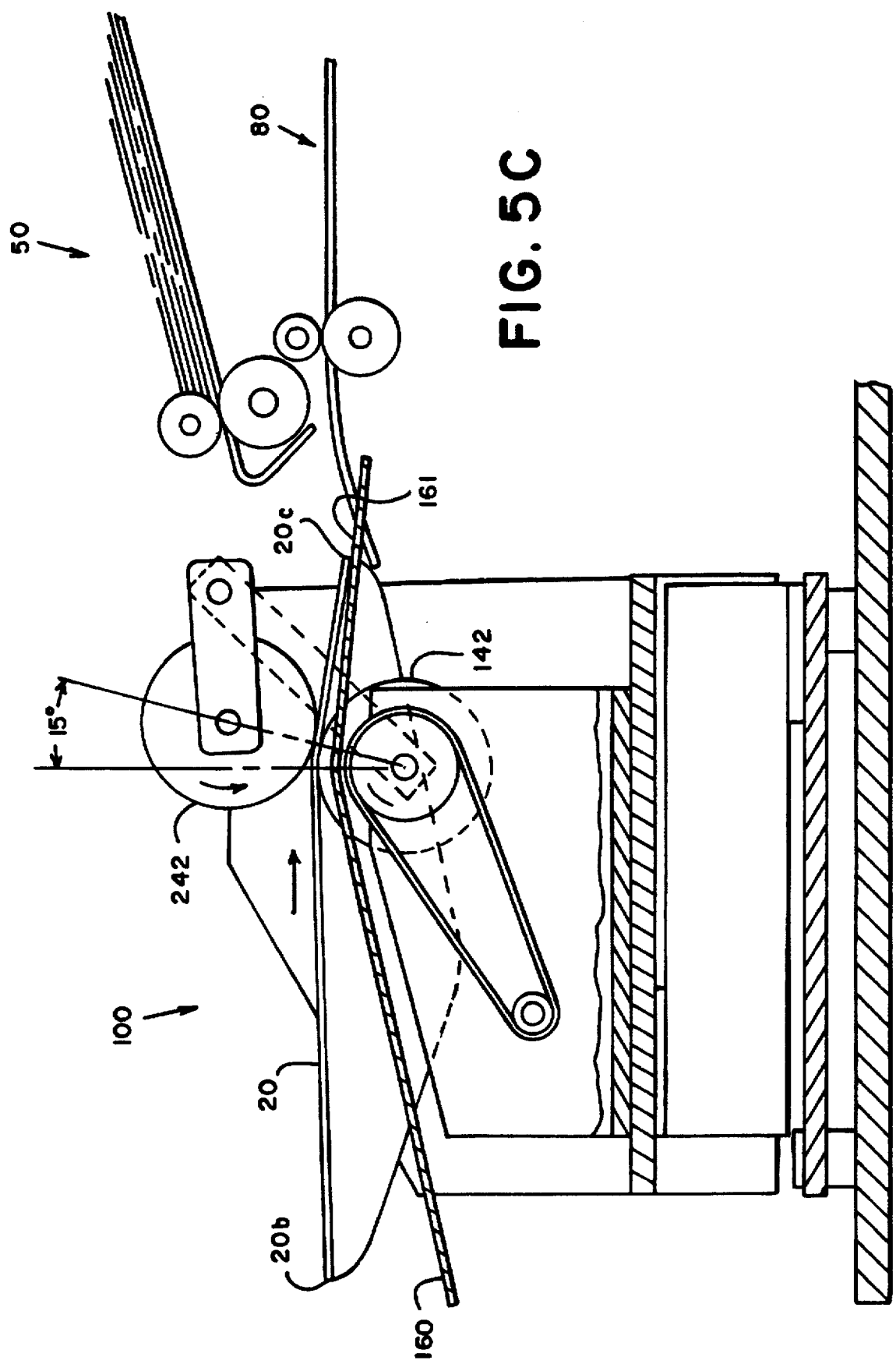

TRANSPORT APPARATUS FOR A WEIGHING MODULE

FIELD OF THE INVENTION

This invention relates to weighing modules or scales. More particularly, this invention is directed to a weighing module having an associated transport apparatus for conveying a document or mailpiece, such as an envelope.

BACKGROUND OF THE INVENTION

Mailing machines are well known. The typical mailing machine includes a variety of different modules or subsystems where each module performs a different task on a mailpiece, such as: singulating (separating the mailpieces one at a time from a stack of mailpieces), sealing, applying evidence of postage and stacking. Recently, mailing machines have begun to integrate weighing modules into the mailpiece path for the purpose of handling mailpieces of mixed variety having variable weights. Generally, the weighing module is located upstream from the postage applying module so that the weight of each mailpiece may be utilized to determine the correct amount of postage to apply. Thus, the correct amount of postage is set automatically depending upon the weight of the mailpiece provided by the weighing module. It is also possible for the weighing module to be co-resident with the printing module which applies indicia of postage to the mailpiece.

This capability is desirable because it allows the mailing machine to process non-uniform or mixed mailpieces. Otherwise, all the mailpieces to be processed by the mailing machine would first have to be manually presorted according to their weight. This manual presorting adds greatly to the operating costs of a mail processing facility. Therefore, incorporating a weighing module into the mailing machine is desirable because it leads to increased automation saving both time and money for purchasers of such mailing machines through reduced labor costs.

An example of a mailing machine incorporating a weighing module is the Paragon® available from Pitney Bowes Inc., Stamford, Conn. Another example is described in U.S. Pat. No. 4,742,878. In both of these examples, the weighing module is incorporated directly into the mailpiece path to create a mailing machine with integrated or "in-line" weighing capability. The mailpieces travel from left to right, as viewed by the operator, through the various modules of the respective mailing machines. Thus, each mailpiece travels in a substantially linear path.

Although such mailing machines generally work well, they suffer from a disadvantage in that the overall length of the machines is greatly increased. As customers demand increased automation to save costs, the number of modules added to the mailing machine continues to grow. With each additional module, the overall length of the mailing machine accordingly increases. However, the increased length of the mailing machine runs against another goal of the customers which is to minimize the space that their business equipment occupies.

Still another example of a mailing machine incorporating a weighing module is described in U.S. Pat. No. 4,893,249 which discloses two embodiments of a mailing machine with a non-linear mailpiece path. However, the embodiments of the '249 patent suffer from disadvantages. In a first embodiment of the '249 patent, the mailpiece travels through the mailing machine in a vertically oriented V-shaped path. One problem is that this embodiment results in very tall mailing machine since the modules are arranged vertically. This vertical mailing machine is inappropriate for use as a table top mailing machine due to its height. Thus, it must stand freely on the ground occupying valuable office space. Another problem is that positive control over the mailpiece is not maintained. Arms 53 and 56, as shown in FIG. 1 of the '249 patent, deflect the mailpiece onto a tray 57 of the weigh module 14 by pivoting toward the tray 57. In this arrangement, gravity and inertia are relied upon to bring the mailpiece to rest in the proper position on the tray 57. This arrangement suffers from reliability problems since the exact positioning (alignment, registration, skew, etc.) of the mailpiece is not positively controlled. In other words, the mailpiece is allowed to drop or fly into position instead of being driven into position. Since the mailpiece is susceptible to air currents and paper flutter, it may not achieve proper positioning which may lead to further problems downstream such as inaccurate weighing or jams.

In a second embodiment of the '249 patent, the mailpiece travels through the mailing machine in a horizontally oriented V-shaped path. Although this embodiment is suitable for use as a table top mailing machine and reduces the overall length of the mailing machine, it suffers from the disadvantage that it does not maintain positive control over the mailpiece. As shown in FIG. 3 of the '249 patent, deflector 109 and a vertical wall 106 are used to stop horizontal movement of the mailpiece causing the mailpiece to drop onto platform 107. As in the first embodiment, this embodiment suffers from reliability problems because the mailpiece is not positively controlled. As the mailpiece drops, it is susceptible to bounce back from wall 106, air currents and paper flutter. Therefore, the positioning problems discussed above are also inherent in this embodiment.

Yet another example of a mailing machine incorporating a weighing module into a mailing machine having a non-linear mailpiece path is described in U.S. Pat. No. 4,892,162. However, this example suffers from the same disadvantages as those described above for U.S. Pat. No. 4,893,249.

Accordingly, there is a need for a weighing module having an associated transport apparatus for conveying a mailpiece that reduces the overall footprint of the mailing machine, is appropriate for table top use and maintains positive control over the mailpiece.

SUMMARY OF THE INVENTION

The present invention provides a transport apparatus for a weighing module and a method for transporting a mailpiece into and out of a weighing module. Conventionally, this invention may be incorporated into a mailing machine or other mailpiece handling apparatuses.

In accordance with the present invention, the apparatus comprises a device for transporting or feeding the mailpiece and a device for positioning the transport device in a first position for receiving the mailpiece from a first direction and accepting the mailpiece into the weighing module. Additionally, the positioning device moves the transport device into a second position for feeding the mailpiece in a second direction out of the weighing module. The feed device includes a drive roller and an idler roller for keeping the mailpiece in operative engagement with the drive roller.

In accordance with the present invention, the method comprises the step(s) of: (a) positioning a transport device in a first position for receiving the mailpiece from a first direction; (b) feeding the mailpiece in the first direction into the weighing module; and (c) positioning the transport device in a second position for feeding the mailpiece in a second direction out of the weighing module. Additionally, the method comprises the steps of: (d) feeding the mailpiece in the second direction out of the weighing module; and (e) using a drive device for feeding the mailpiece and an idler device for keeping the mailpiece in operative engagement with the drive device.

Therefore, it is now apparent that the invention substantially overcomes the disadvantages associated with the prior art. For example, the drive device and the idler device create a positive nip which maintains accurate control over the mailpiece.

Additional advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiments given below, serve to explain the principles of the invention. As shown throughout the drawings, like reference numerals designate like or corresponding parts.

FIGS. 5A-5D are a sequence of simplified illustrations along the same vantage point as taken in FIG. 1 which are representative of the weighing module performing one cycle of operation in accordance with the present invention.

DETAILED DESCRIPTION OF THE PREFERRED EMBODIMENTS

Figure 1:
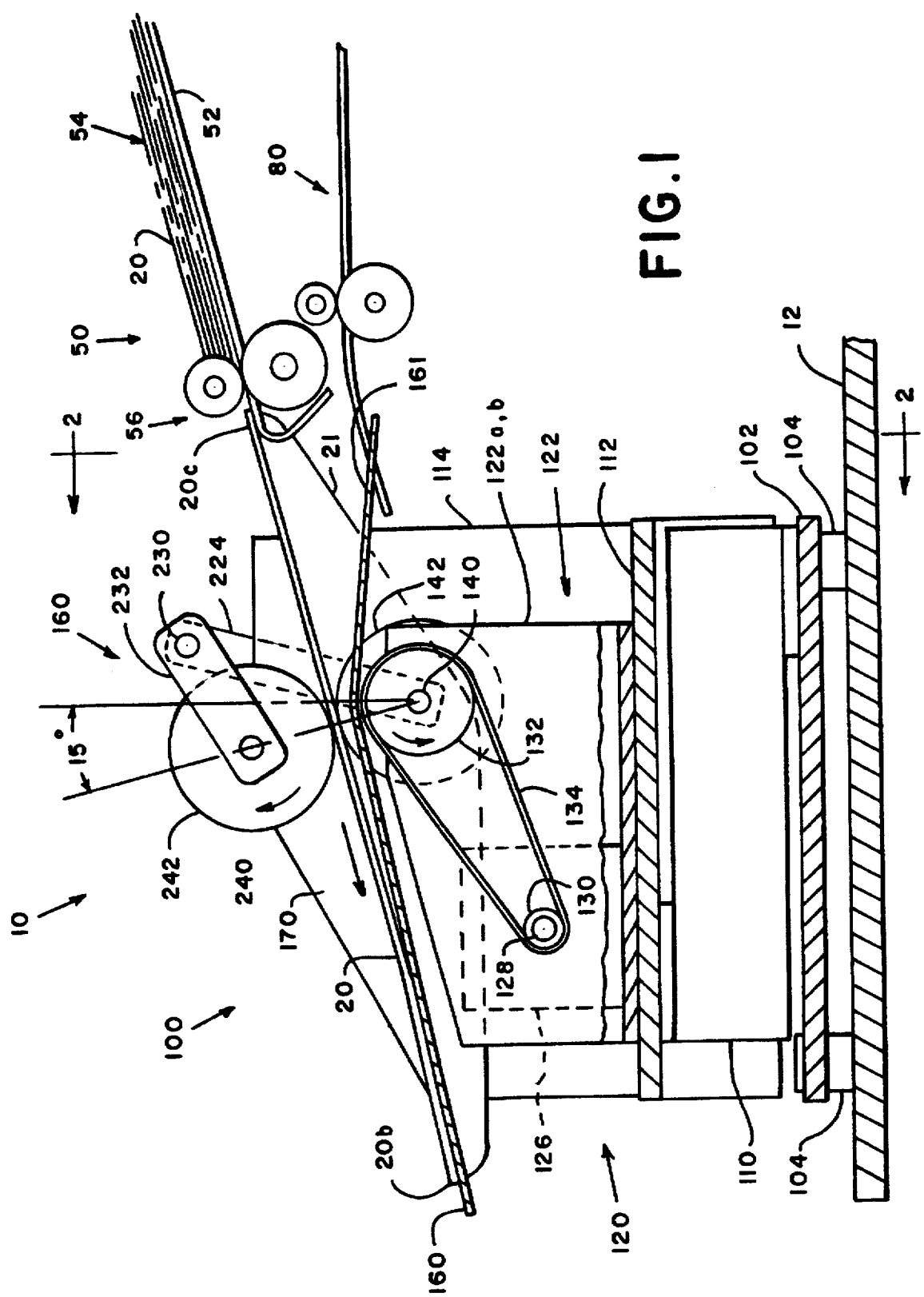
FIG. 1 is a simplified illustration of a front sectional view of a weighing module with a partial view of a mailing machine in accordance with the present invention taken along the line 1—1 as shown in FIG. 2.

Referring to FIG. 1, a partial or incomplete mailing machine 10 is shown which includes: an input module 50, a weighing module 100 and a subsequent downstream module 80. The input module 50 includes a tray 52 for supporting a stack 54 of mailpieces, such as envelopes, and a feed means 56 for feeding envelopes 20 having a leading edge 20b and trailing edge 20c from the stack 54 one at a time to the weighing module 100. To reduce the overall footprint or length of the mailing machine 10, the input module 50 is located vertically above module 80. Whereas the feed path of module 80 is generally horizontal, the feed path of the input module 50 is approximately 15 degrees from horizontal. This reduces the overall impact of locating the input module 50 above the downstream module 80 on the height of the mailing machine 10. Therefore, the envelopes 20 enter the weighing module 100 from a first direction and exit in a second direction which is substantially opposite to the first direction.

Input modules are well known in the art and thus input module 50 may be of any suitable conventional design. For example, input module 50 may include a reverse belt feeder assembly (not shown) for singulating and feeding individual envelopes 20 to the weighing module 100. After passing through the weighing module 100, the envelope 20 is fed into module 80 for further processing. Module 80 may perform any number of different tasks on the envelope 20 depending upon the particular configuration of the mailing machine 10. A list of some of the possible tasks which module 80 could perform has already been provided above. Since input module 50 and module 80 do not constitute a part of the present invention, their descriptions will be limited to only that which is necessary for an understanding of the present invention.

Figure 2:
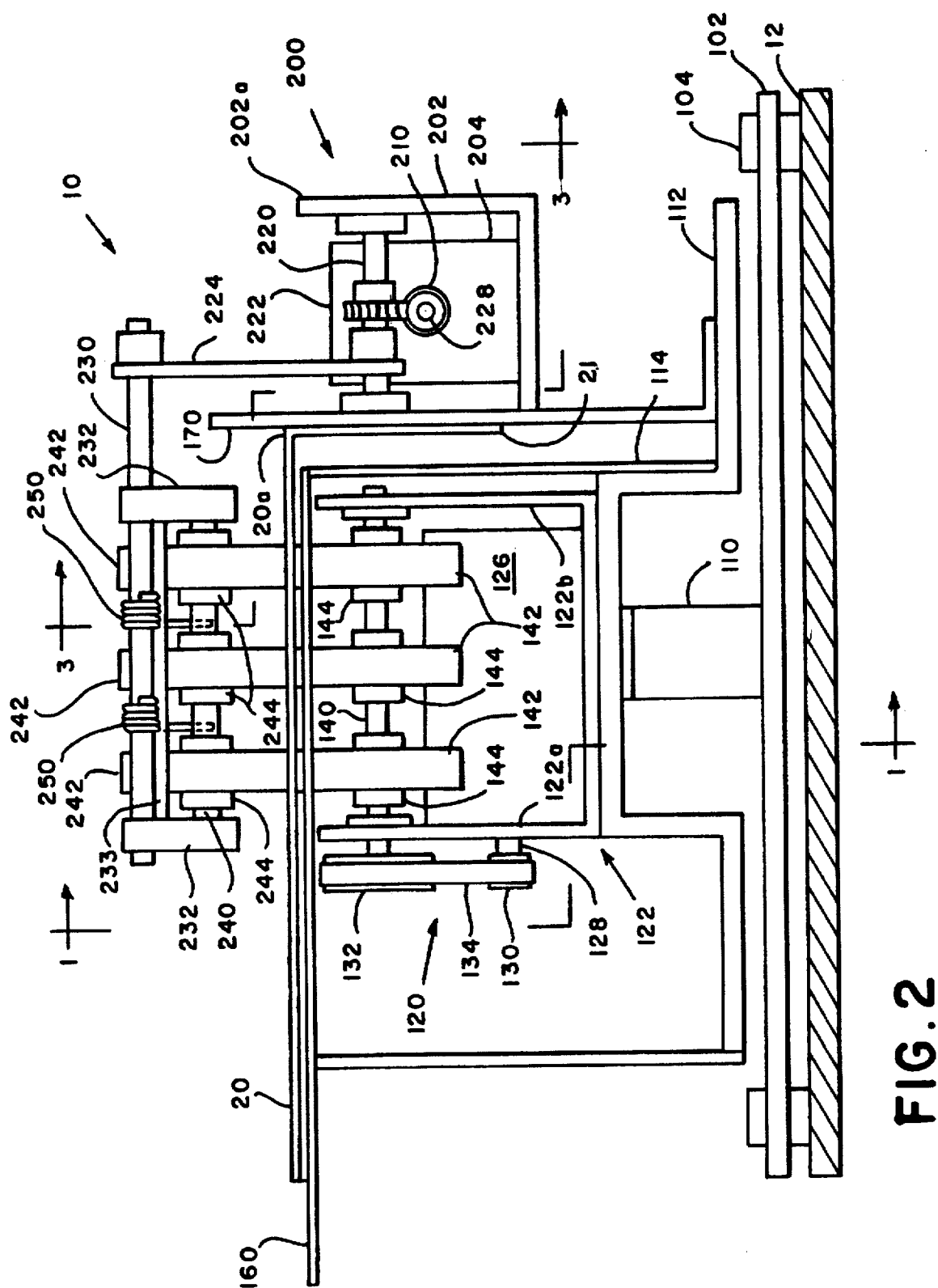
FIG. 2 is a simplified illustration of a side sectional view of the weighing module in accordance with the present invention taken along line 2—2 as shown in FIG. 1.
Figure 3:
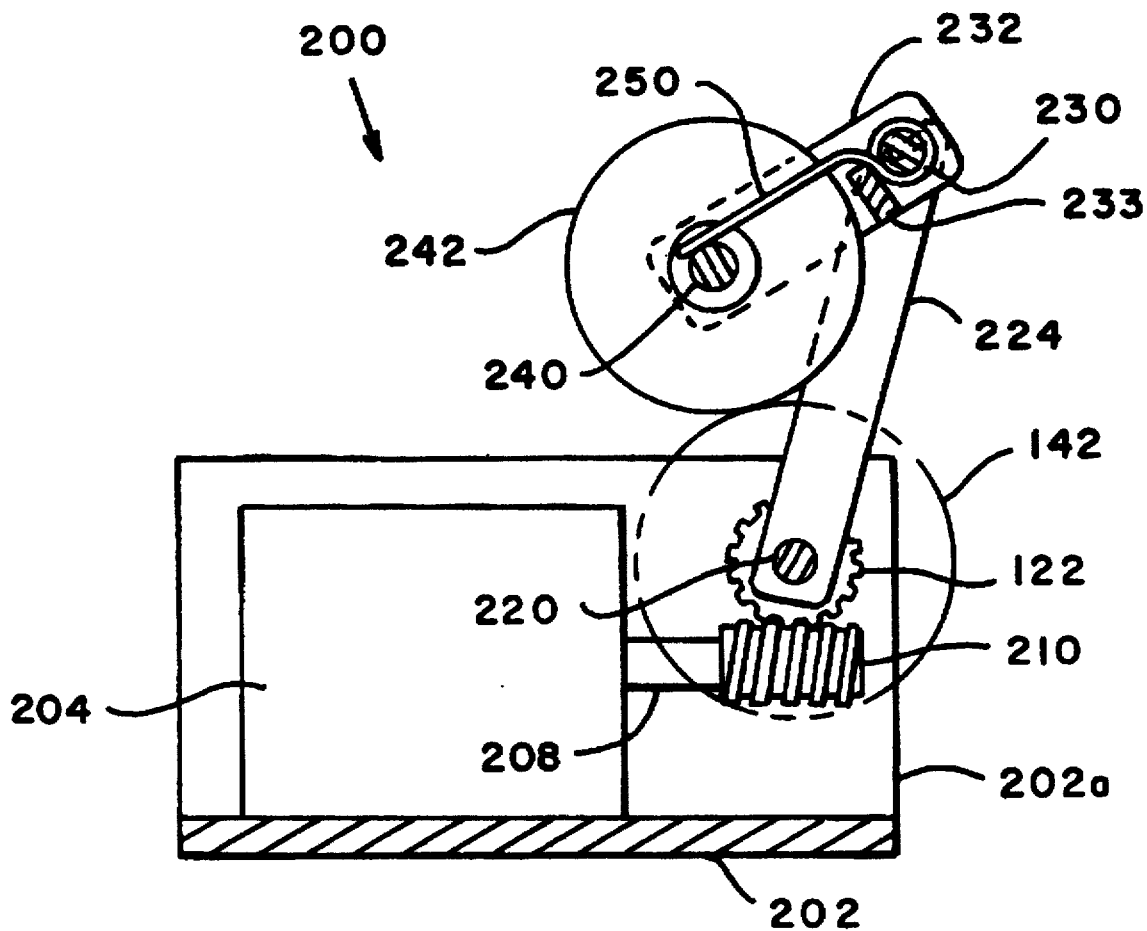
FIG. 3 is a simplified illustration of a front sectional view of the weighing module in accordance with the present invention taken along the line 3—3 as shown in FIG. 2.

Referring now to FIGS. 1-3, the weighing module 100 will be described. The weighing module 100 is built up from lower support plate 102 which is fixably mounted to a base 12 of the mailing machine 10 using isolation dampers 104. Dampers 104 absorb the energy associated with the impact of the incoming envelope 20 and also serve to reduce undesirable effects on the weighing module 100 of vibrations produced elsewhere in the mailing machine 10. This allows for accurate weighing soon after the envelope 20 enters the weighing module 100. A load cell 110, of any suitable conventional design, is mounted to extend between the lower support plate 102 and an upper support plate 112 which bears the weight of the remaining components of the weighing module. Those skilled in the art refer to this as tare weight. In calibrating the load cell 110, the tare weight is taken into account so that accurate weight readings are obtained for the envelop 20. Generally, the upper support plate 112 and the lower support plate 102 are designed so that under normal operating conditions they do not touch each other. However, they may incorporate stops (not shown) to protect the load cell 110 from damage due to over travel.

Mounted to the upper support plate 112 is a transport apparatus 113 including a drive system 120 and an idler or normal force system 200. The drive system 120 includes a drive support plate 122 fixably mounted to the upper support plate 112 for supporting the drive system 120. The drive system further includes a brushless motor 126 having a pulley 130 fixably mounted on its output shaft 128, a drive shaft 140 rotatively mounted to two opposed vertical walls 122a and 122b of the drive support plate 122, a pulley 132 fixably mounted to one end of the drive shaft 140, an endless belt 134 extending around pulleys 130 and 132, and a plurality of drive rollers 142 fixably mounted to the drive shaft 140 using hubs 144. Therefore, as the drive motor 126 is energized and accordingly the output shaft 128 rotates, the drive rollers 142 correspondingly rotate. It is important to note that drive motor 126 is a reversible motor such that the drive rollers 142 may be caused to rotate in either a clockwise or counterclockwise direction.

The weighing module 100 further includes a deck 160 supported by suitable structure 114 mounted to the upper support plate 112 and a registration wall 170 which is also mounted to the upper support plate 112. The envelope 20 rides along the deck 160 which contains suitable openings for the drive rollers 142. Additionally, the top edge 20a of the envelope 20 rides against the registration wall 170. Generally, a gap exits between the deck 160 and the registration wall 170 so that the envelope 20 may be fed in flapped fashion, meaning that the envelope flap 21 is open.

The idler system 200 includes an idler support plate 202 fixably mounted to the registration wall 170 and a brushless pivot motor 204 fixably mounted to the idler support plate 202 having a worm gear 210 fixably mounted to its output shaft 208. Rotatively mounted to extend between the registration wall 170 and a wall 202a of the idler support plate is a shaft 220 which is generally in axial alignment with the drive shaft 140. Fixably mounted to the shaft 220 is both a gear 222 which is in intermeshing relationship with the worm gear 210 and one end of a pivot arm 224. Fixably mounted to the other end of the pivot arm 224 is an intermediate shaft 230 which extends generally above and parallel to the deck 160. One end of an H-shaped idler roller arm 232 is pivotally mounted to the intermediate shaft 230 while an idler roller shaft 240 is rotatively mounted to the other end of the idler roller arm 232. A cross member 233 provides rigidity for the arm 232. Using bearing hubs 244, a plurality of idler rollers 242 are rotatively mounted to the shaft 240 so as to be in operative engagement with the drive rollers 142. Thus, the idler rollers 242 are free to rotate about the shaft 240 due to friction with the drive rollers 142. A plurality of torsion springs 250 are fixably mounted at one end to the idler shaft 230 and at the other end to the shaft 240 so that the idler rollers 242 are biased toward the drive rollers 142.

To further reduce the undesirable effects of vibration on the weighing module 100, the support structure described above is designed so as to obtain a high degree of stiffness and possess a high natural frequency.

It should be apparent to those skilled in the art that the nip between idler rollers 242 and the drive rollers 142 create a positive transport system. Because of the spring bias, the envelope 20 is held securely in the nip between the idler rollers 242 and the drive rollers 142. Thus, accurate positioning and registration of the envelope 20 is maintained without slippage.

Since the pivot motor 204 is also a reversible motor, the pivot arm 224 is capable of rotating both clockwise and counter-clockwise. As the pivot arm 224 rotates, the idler rollers 242 reposition accordingly. The springs 250 keep the idler rollers 242 biased toward the drive rollers 142 regardless of the angular position of the pivot arm 224. Thus, the idler rollers 242 orbit around the drive rollers 142 forming the nip at different locations around the periphery of the drive rollers 142 depending upon the angular position of the pivot arm 224.

Figure 4:
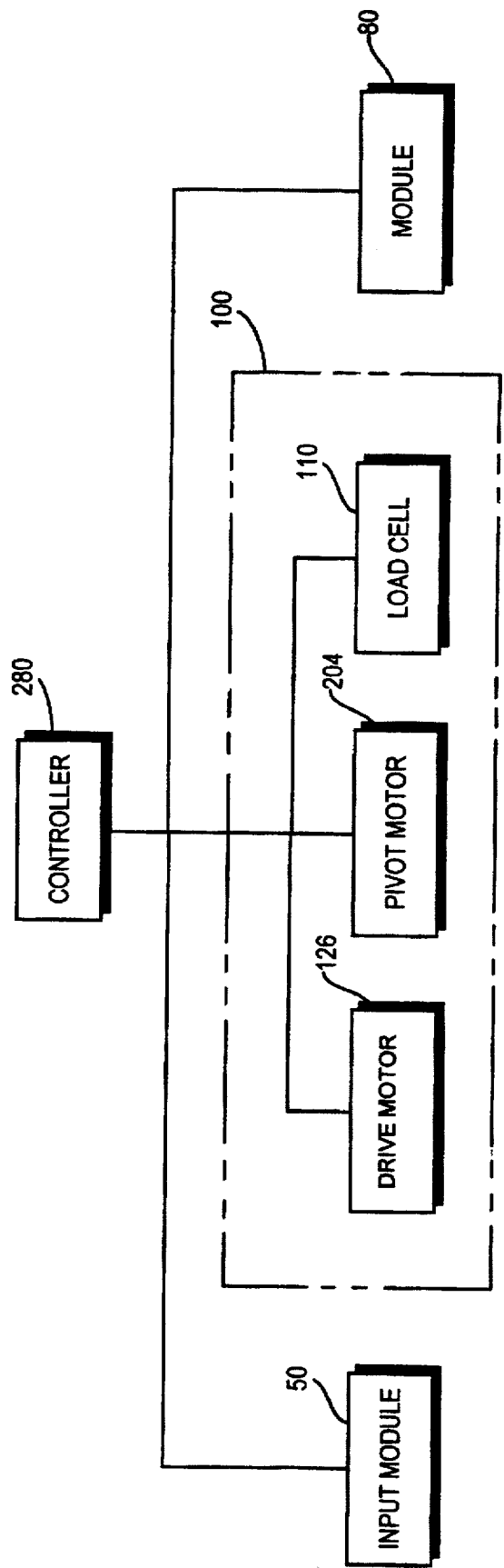
FIG. 4 is a schematic diagram of a control system of the weighing module in accordance with the present invention.

Referring to FIGS. 1 and 4, a controller 280 is in operative communication with the input module 50, the weighing module 100 and any downstream modules such as module 80 for coordinating feeding and processing of envelopes 20 through the mailing machine 10. With respect to the weighing module 100, the controller is in operative communication with the drive motor 126, the pivot motor 204 and the load cell 110 via suitable drivers and electronics (not shown). The controller 280 is responsible for energizing and controlling the direction and position of the drive motor 126 and the pivot motor 204. Additionally, the controller 280 obtains signal data from the load cell 110 indicative of the weight of the envelope 20. In the preferred embodiment, the controller 280 is a microprocessor based system having suitable software, hardware and memory for performing its functions. However, the exact configuration of the controller 280 does not constitute a part of the present invention.

Figure 5A:
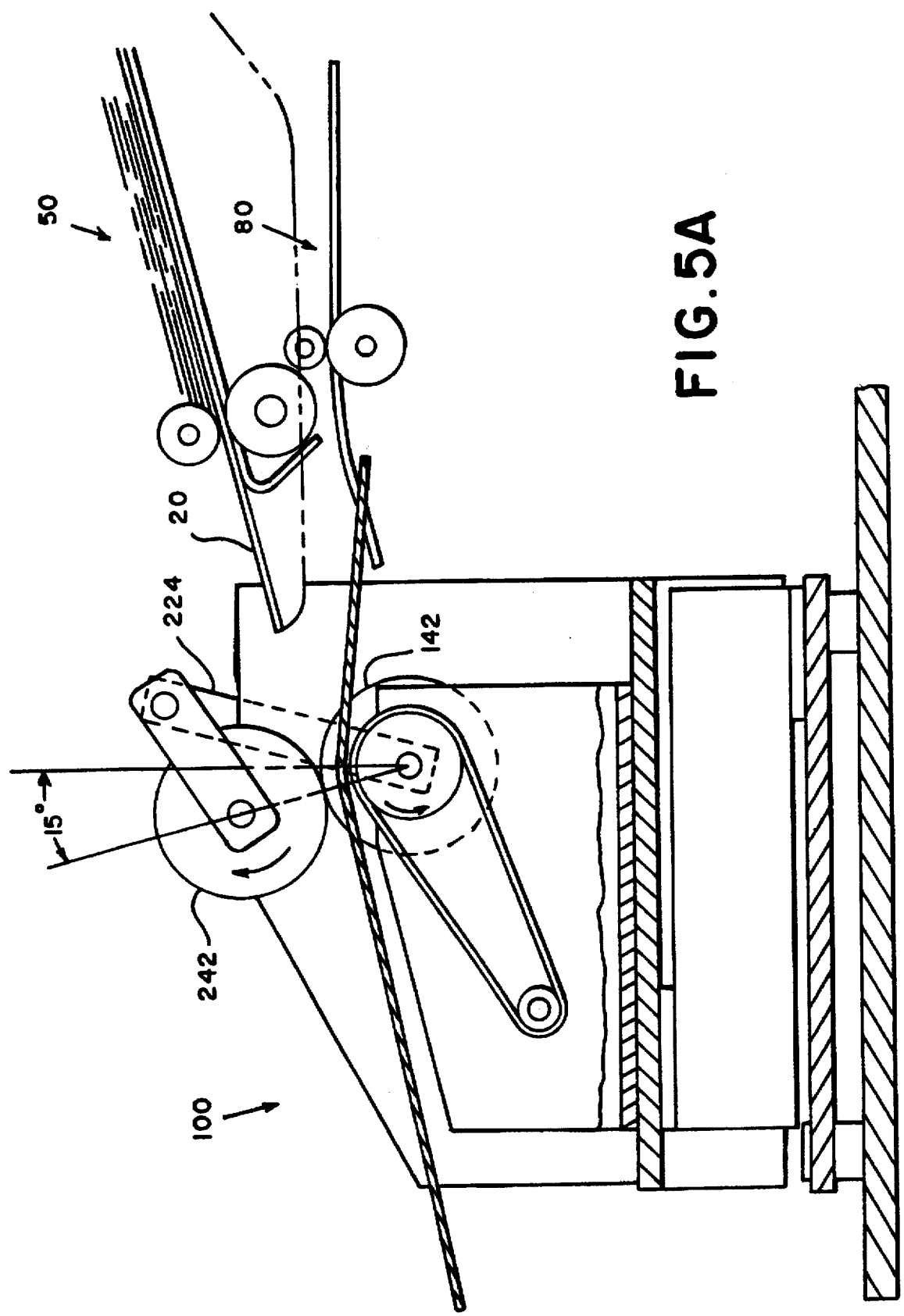

With the basic structure of the weighing module 100 described, the operational characteristics will now be described with reference to FIGS. 1–4 and particularly FIGS. 5A–5D, which represent one cycle of operation. Referring predominately to FIG. 5A, the idler rollers 242 are in an incoming position for receiving the envelope 20 from the input module 50. The pivot motor 204 has positioned the pivot arm 224 so that a line running through the centers of the idler rollers 242 and the drive rollers 142 is approximately 15 degrees counter clockwise from vertical. Additionally, the idler rollers 242 and the drive rollers 142 are spaced at a distance from the input module 50 so that their nip is in alignment with the feed path of the input module 50. In this manner, the weighing module 100 can effectively receive the envelope 20 from the input module 50 with reduced risk of jams or misfeeds. Accordingly, the drive rollers 142 and the idler rollers 242 rotate in the direction indicated by the arrows to feed the envelope 20 into the weighing module 100.

Figure 5B:
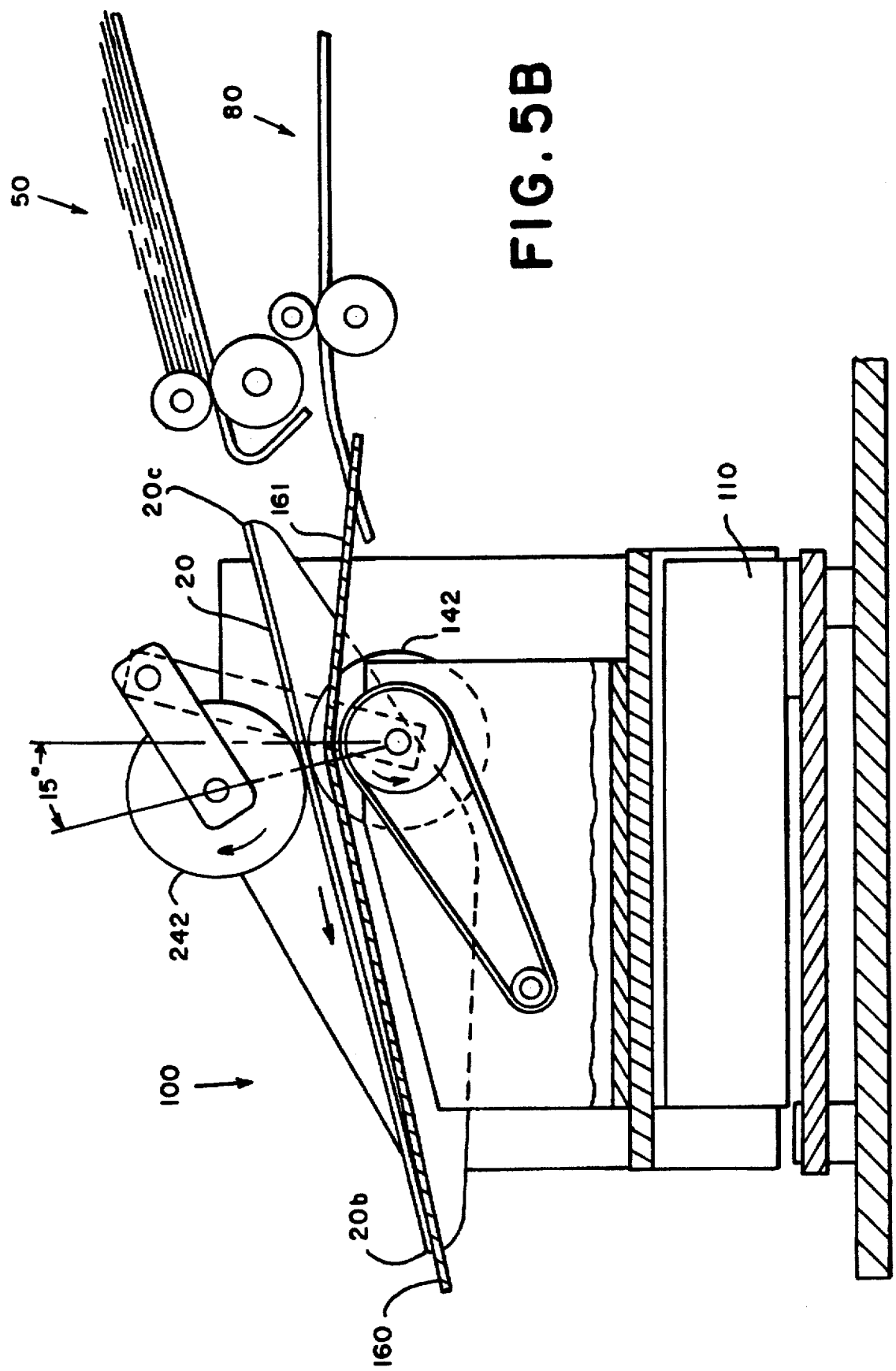

Referring predominately to FIG. 5B, the envelope 20 has been fed into position for weighing and the drive rollers 142 and the idler rollers 242 have ceased rotating. It is important that in this position, the envelope 20 is no longer touching the input module 50 or any other structure outside of the weighing module 100. In this way, the entire weight of the envelope 20 will bear on the load cell 110. Leading edge 20b along with a substantial portion of the envelope 20 is resting on deck 160 while trailing edge 20c is above deck 160. This is due to the stiffness of the envelope 20 and the shape of the exit flange 161 of the deck 160. At this point, the signal data supplied by the load cell 110 can be sampled to obtain the weight of the envelope 20. Typically, the envelope 20 is held in this position until the sampled signal data are no longer under the influence of external vibrations and noise and have reached equilibrium.

Referring predominately to FIG. 5C, once reliable sampled signal data has been obtained, the pivot motor 204 causes the idler rollers 242 to reposition to an ejection position for feeding the envelope 20 out of the weighing module 100. In this position, a line running through the centers of the idler rollers 242 and the drive rollers 142 is approximately 15 degrees clockwise from vertical. The effect of this repositioning of the idler rollers 242 is to cause the envelope 20 to assume a different posture. Although the envelope 20 is still captured in the nip, trailing edge 20c has been forced downward into contact with the deck exit flange 161 while leading edge 20b has risen above the deck 160. In this posture, the envelope 20 is in position to be fed out of the weighing module 100 and into downstream module 80. In essence, the repositioning of the idler rollers 242 produces a see-saw effect on the envelope 20. However, the exact behavior of the envelope 20 will depend upon its stiffness. The contents of the envelope 20 will also influence this factor.

Figure 5D:
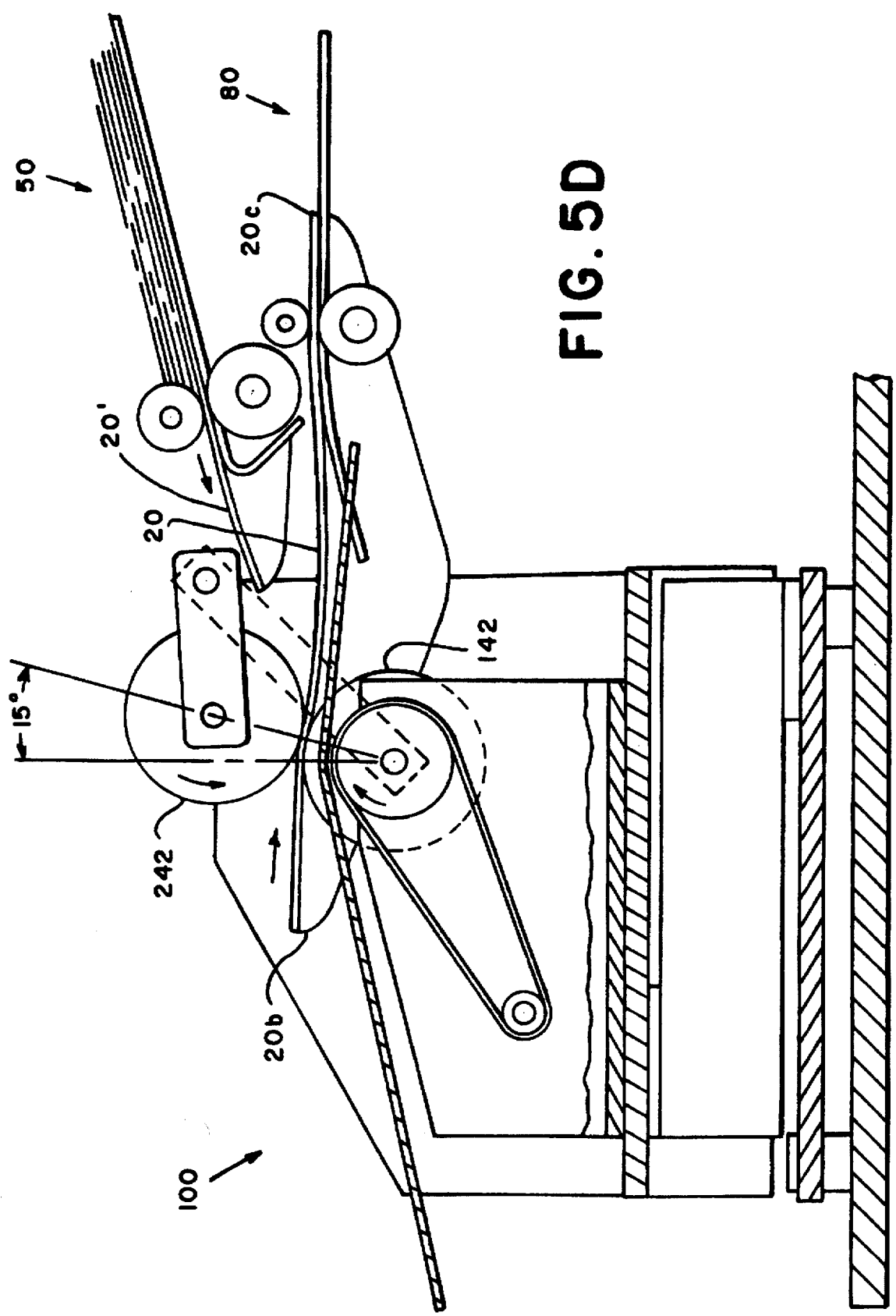

Referring predominately to FIG. 5D, the drive rollers 142 rotate now in opposite fashion from that shown in FIG. 5A. Thus, the envelope 20 is feed out of the weighing module 100 and toward the module 80 without interfering with a subsequent envelope 20' which is being fed down from input module 50. It is important to note that the trailing edge 20c has now become the new leading edge of the envelope 20 and accordingly, the leading edge 20b has become the new trailing edge. Once the envelope 20 has been completely fed from the weighing module 100, the pivot motor 204 repositions the idler rollers 242 to the first position to accept the subsequent envelope 20'.

It should now be apparent that the weighing module 100 receives the envelope 20 from a first direction, feeds the envelope 20 in the first direction so as to bring the envelope 20 into position for weighing, weighs the envelope 20 and feeds the envelope 20 is a second direction which is substantially opposite to the first direction so as to eject the envelope 20 from the weighing module 100. Accordingly, the input and output feed speeds can be selected to provide a continuous stream of envelopes 20 to the downstream module 80 where spacing between the envelopes 20 is maintained at desired levels.

A benefit of the present invention is the capability to optimize system throughput. In prior art systems, the envelope must travel the entire length of a tray which is designed to accommodate very large or long envelopes. Typically, these trays approach 15 inches in length. Thus, even short envelopes must travel this same distance. In contrast, the present invention allows for different treatment of long and short envelopes because each envelope need only be fed into the weighing module 100 so far as to isolate it from the input module 50. Therefore, short envelopes travel less distance than long envelopes which increases throughput.

Those skilled in the art will recognized that the transport apparatus 113 including the drive system 120 formed by the drive rollers 142, and their associated drive components, in cooperation with the idler system 200 formed by the idler rollers 242, and their associated drive components, could be redesigned to achieve substantially the same result as the present invention in substantially the same way. For example, the roller based system of the preferred embodiment could be replaced with a belt or O-ring based system. Additionally, numerous mechanical and electro-mechanical system exist which could serve to reposition the envelope in a different posture for ejection, such as solenoid operated deflecting fingers. Furthermore, the idler rollers 242 could be fixed and the drive rollers 142 could be repositioned to achieve the same result.

Figure 6:
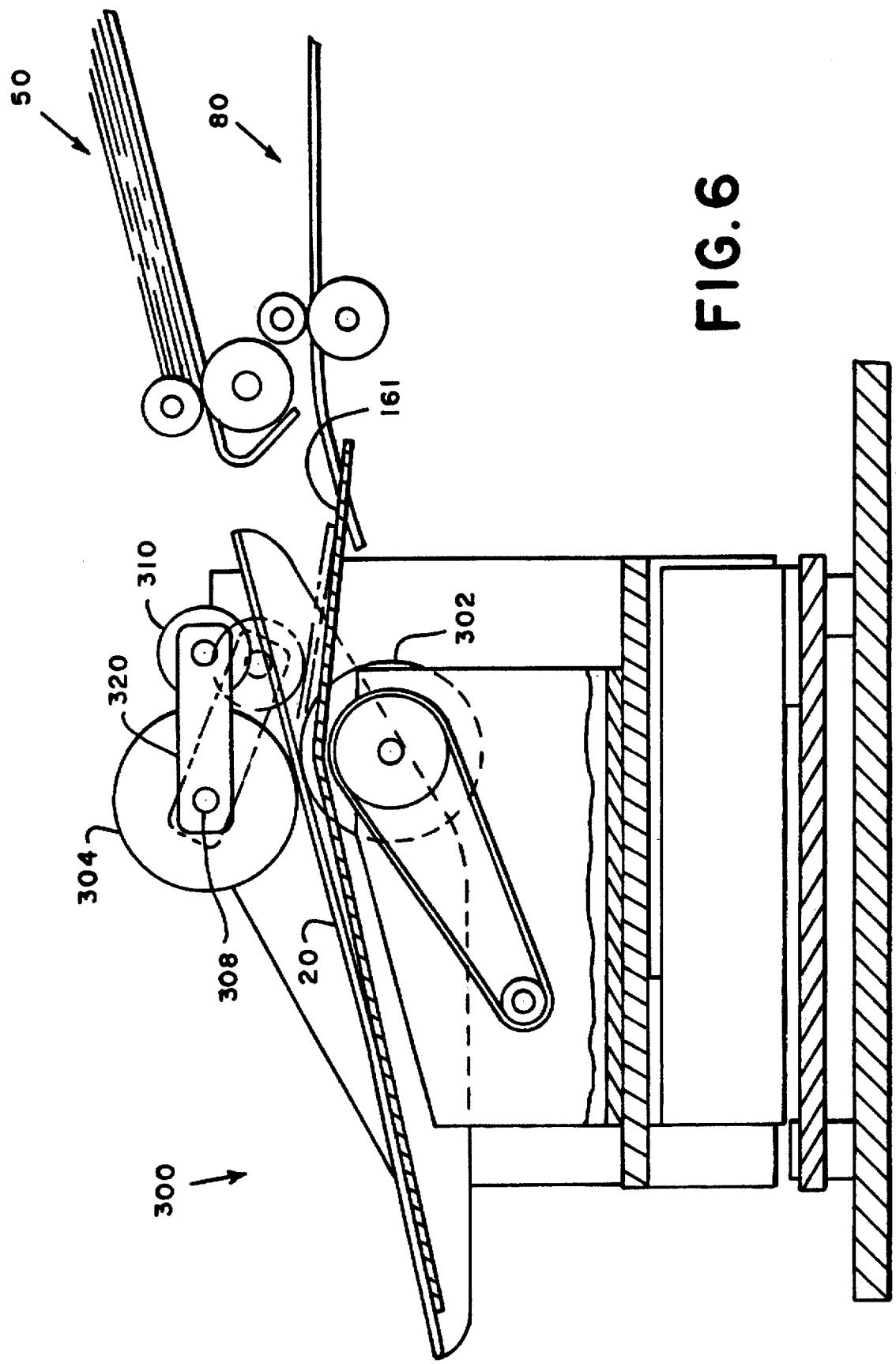
FIG. 6 is a simplified illustration of a second embodiment of the present invention along the same vantage point as taken in FIG. 1.

For example, referring to FIG. 6, a second embodiment of the present invention is shown which is particularly well suited to processing thin or flexible envelopes 20. In this embodiment, the drive rollers 302 and the idler rollers 304 are in fixed relationship. That is, the idler rollers 304 do not orbit around the drive rollers 302. In stead, an auxiliary roller 310 is utilized to redirect the envelope 20. The auxiliary roller 310 is rotatively mounted to one end of an arm 320 while the other end of the arm 320 is rotatively mounted to the idler roller shaft 308. In the input position, the arm 320 is rotated above the feed path of the envelope 20 so that the auxiliary roller 310 does not contact the envelope 20. Thus, the envelope 20 may be received from the input module 50 and fed into the weighing module 300. After weighing has been completed, the arm 320 rotates into the ejection position as shown in dotted lines. This has the effect of pressing the envelope 20 down and into contact with the deck exit flange 161. Any suitable mechanism, such as a rotary solenoid, could be used to actuate the arm 320 between the input and ejection positions. Therefore, the auxiliary roller 310 is used to control the direction of the lead edge of the envelope 20 as it is fed out of the weighing module 100. In this manner, the ejection direction is controlled.

Those skilled in the art will still further recognize that it is possible to operate by the drive rollers 142 and the pivot arm 224 from a single motor. However, the preferred embodiment has utilized separate motors to provide the extra advantageous capability of commencing to feed the envelope 20 from the weighing module 100 while repositioning the idler rollers 242 to from the input position to the ejection position. Thus, the preferred embodiment has the benefit of increased system throughput.

Furthermore, those skilled in the art will recognize that the deck 160 need not be stationary. The deck 160 could also pivot to assist non-rigid envelopes in entering and exiting the weighing module 100.

Moreover, those skilled in the art will also recognized that the above descriptions and the attached drawings have been provided by way of illustration and that numerous further embodiments of the present invention exists. Therefore, the invention in its broader aspects is not limited to the specific details of the preferred embodiment. Accordingly, various modifications may be made without departing from the spirit of the general inventive concept as defined by the appended claims and their equivalents.

What is claimed is:

1. A transport apparatus for feeding a mailpiece into and out of a weighing module, the apparatus comprising:

means for feeding the mailpiece; and means for positioning the feeding means in a first position for receiving the mailpiece from a first direction and feeding the mailpiece into a weighing position and for positioning the feeding means in a second position for feeding the mailpiece in a second direction out of the weighing module.

2. The transport apparatus of claim 1, wherein:

the feeding means includes drive means for feeding the mailpiece and idler means for keeping the mailpiece in operative engagement with the drive means so that the mailpiece is positively controlled therebetween.

3. The transport apparatus of claim 2, wherein:

the first direction and the second direction are substantially opposite to each other.

4. The transport apparatus of claim 3, wherein:

the positioning means repositions the idler means between the first and the second positions; and the mailpiece assumes a first posture when feeding in the first direction and a second posture when feeding in the second direction.

5. The transport apparatus of claim 4, wherein:

the drive means includes a drive roller operatively connected to a drive motor;

the idler means includes an idler roller in operative engagement with the drive roller to form a nip therebetween; and the positioning means causes the idler roller to orbit around the drive roller between the first and the second positions.

6. The transport apparatus of claim 5, wherein:

the positioning means includes a pivot motor operatively connected to one end of a pivot arm while the idler roller is operatively connected to the other end of the pivot arm.

7. The transport apparatus of claim 6, wherein:

the first direction is approximately 15 degrees from horizontal; and the second direction is substantially horizontal.

8. The transport apparatus of claim 7, wherein:

the weighing module includes a tare weight and the transport apparatus is part of the tare weight.

9. The transport apparatus of claim 8, wherein:

the drive roller rotates in opposite directions to feed the envelope in the first direction and second direction, respectively.

10. The transport apparatus of claim 2, wherein:

the feeding means further includes a means for controlling the position of the lead edge of the mailpiece.

11. The transport apparatus of claim 10, wherein:

the controlling means includes an auxiliary roller operatively connected to a solenoid for repositioning the auxiliary roller into and out of contact with the mailpiece.

12. The transport apparatus of claim 11, wherein:

the first direction is approximately 15 degrees from horizontal; and the second direction is substantially horizontal.

13. The transport apparatus of claim 12, wherein:

the weighing module includes a tare weight and the transport apparatus is part of the tare weight.

14. A method of transporting a mailpiece into and out of a weighing module, the method comprising the steps of:

(a) positioning a feeding means in a first position for receiving the mailpiece from a first direction;

(b) feeding the mailpiece in the first direction into a weighing position; and (c) positioning the feeding means in a second position for feeding the mailpiece in a second direction out of the weighing module.

15. The method of claim 14, further comprising the step(s) of:

(d) feeding the mailpiece in the second direction out of the weighing module; and (e) using a drive means for feeding the mailpiece and an idler means for keeping the mailpiece in operative engagement with the drive means as the feeding means so that the mailpiece is positively controlled therebetween.

16. The method of claim 15, wherein:

the first direction and the second direction are substantially opposite to each other.

17. The method of claim 16, further comprising the step(s) of:

(f) repositioning the idler means between the first and the second positions, such that the mailpiece assumes a first posture when feeding in the first direction and a second posture when feeding in the second direction.

18. The method of claim 17, further comprising the step(s) of:

(g) using a drive roller operatively connected to a drive motor as part of the drive means;

(h) using an idler roller as part of the idler means in operative engagement with the drive roller to form a nip therebetween; and (i) repositioning the idler roller between the first and the second positions so as to orbit around the drive roller.

19. The method of claim 15 wherein the weighing module includes a tare weight, the method further comprising the step(s) of:

(f) including the feeding means in the tare weight.

20. The method of claim 14, further comprising the step(s) of:

(d) using an auxiliary roller for controlling the position of the lead edge of the mailpiece; and (e) repositioning the auxiliary roller into and out of contact with the mailpiece.

* * * * *